March 1, 1955 P. A. HARTER 2,703,378
ELECTROMAGNET
Filed April 2, 1952
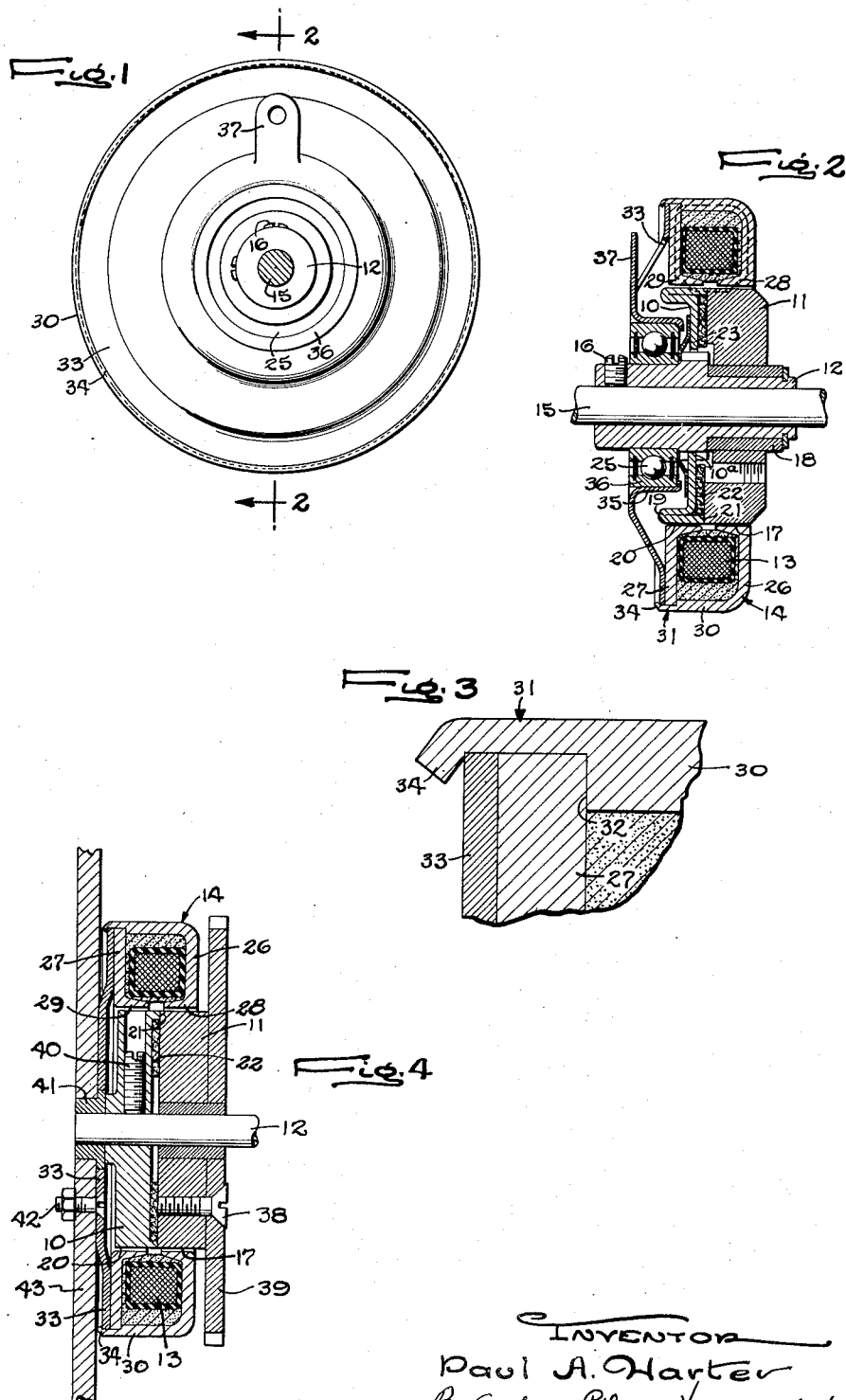
INVENTOR
Paul A. Harter
By Carlson, Pitzner, Hubbard & Wolfe
ATTORNEY

United States Patent Office 2,703,378
Patented Mar. 1, 1955

2,703,378

ELECTROMAGNET

Paul A. Harter, Beloit, Wis., assignor to Warner Electric Brake & Clutch Company, South Beloit, Ill., a corporation of Illinois Application April 2, 1952, Serial No. 280,001

2 Claims. (Cl. 317—165)

This invention relates to a magnetic friction clutch of the type disclosed in Patent No. 2,488,552 in which the driving and driven clutch elements are drawn into axial gripping engagement by flux threading axially through said elements and also radially through periphery gaps between the peripheries of the elements and the internal cylindrical pole faces of a magnet ring encircling the elements.

One object is to improve upon the construction of the clutch of the aforesaid patent so as to facilitate accurate manufacture thereof by high production methods.

Another object is to utilize one of the rotary clutch elements in a novel manner to support the magnet core precisely concentric with the clutch elements and thereby maintain the peripheral gap between the clutch elements and magnet pole faces of uniform minimum width.

A further object is to form the magnet core as separate metal stampings and facilitate its mounting precisely concentric with the clutch axis.

Other objects and advantages of the invention will become apparent from the following detailed description taken in connection with the accompanying drawings, in which Figure 1 is an end view of a clutch embodying the novel features of the present invention.

Fig. 2 is a diametrical section taken along the line 2—2 of Fig. 1.

Fig. 3 is an enlarged fragmentary view of a part of Fig. 2.

Fig. 4 is a diametrical sectional view of a modified form of the invention.

In the embodiment of the invention shown in the drawings, the clutch proper comprises two plates 10 and 11 supported by a shaft 12 and adapted to be drawn into axial gripping engagement by magnetic flux threading a path indicated by the dotted lines and created by energization of the winding 13 of a magnet 14 encircling the plates 10 and 11. The shaft 12 in the form shown in Figs. 1 and 2 comprises a tube adapted to be secured as by a set screw 16 to a main shaft 15. The plate 11 has a cylindrical outer peripheral surface 17 and is pressed onto a bearing sleeve 18 journaled and held in axially fixed position on the tube 12.

The other clutch plate 10 is splined at 10ᵃ (Fig. 2) on the exterior of the sleeve 12 and comprises a sheet iron stamping folded at its outer periphery to form a cylindrical flange 19 having an outer surface 20 of the same diameter as the surface 17. The folded over portion of the flange 18 projects inwardly beyond the plate 10 to form a narrow flange 21 which supports a ring-like plate 22 of wear resistant friction material pressed into the flange and seated against the plate 10 with its surface flush with the end of the flange which is adapted for direct engagement with the flat inner face of the plate 11. If desired, the faces of the plates 10 and 11 may be maintained in close proximity at all times by a resilient metal disk 23 lightly compressed between the plate 10 and the inner race 24 of an antifriction bearing 25 pressed onto the sleeve 12.

The core of the magnet 14 encloses the winding 13 and comprises two generally flat rings 26 and 27 axially spaced apart and having internal right angular flanges 28 and 29 turned inwardly toward each other and constituting opposite pole projections having internal faces concentric with and disposed close to the outer peripheries 17 and 20 of the clutch plates. Formed integral with the outer periphery of the ring 26 is a cylindrical flange 30 which is long enough to project across the outer edge of the ring 27 as indicated at 31 and recessed at its free end to form a shoulder 32 spaced from the end of the flange a distance somewhat greater than the thickness of the ring 27 which is pressed into the flange and seated against the shoulder.

Advantage is taken of this two part construction to join the core rings 26 and 27 together in axially spaced relation and also secure the magnet core rigidly to a mounting disk 33 by which the magnet 14 is accurately supported from the shaft 12 so as to maintain the gap between the pole faces and the plate surfaces 17 and 20 of uniform minimum length. To this end, the disk 33 is fitted closely into the projecting end portion 31 of the flange 30 and the parts are locked together rigidly by turning the overhanging part 34 of the flange 30 inwardly thus clamping the disk 33 firmly against the ring 27 as well as locking the rings rigidly together.

The disk 33 may be formed with an internal flange 35 into which is pressed the outer race ring 36 of the antifriction bearing 25. Thus, the magnet 14 is supported from the shaft 12 and mounted rigidly on the outer race of the bearing 25 so that the pole faces of the magnet are located accurately with respect to the shaft 12 and thus may be spaced by high production methods of manufacture close to the outer peripheries 17 and 20 of the clutch plates 11 and 10. The magnet 14 may be held against turning and thus held stationarily by connection of a lug 37 struck out of the disk 33 with a suitable stationary part of the machine in which the clutch is used.

In the modification shown in Fig. 4, the clutch plate 11 is secured as by screws 38 to a gear 39 in the power transmitting connection through the clutch. The plate 10 is secured directly as by a set screw 40 to the shaft 12 on which the hub 41 of the disk 33 is directly journaled. The disk 33 is secured by screws 42 to a suitable support 43.

In operation of the clutches above described, energization of the winding 13 creates magnetic flux which as shown in phantom in Fig. 2 threads radially through the pole projections 28 and 29 into and out of the plates 10 and 11 and axially through the contacting surfaces of the flange projection 21 and the plate 11. The flux thus created results in magnetic attraction and axial gripping engagement of the plates 10 and 11 to frictionally produce a torque proportional to the energization of the winding 13.

I claim as my invention:

1. In a clutch of the character described, the combination of, a generally flat ring of magnetic material having a cylindrical flange around its outer periphery, the free end of said flange being recessed to provide an internal shoulder axially spaced from the flange end, a second magnetic ring pressed into said flange and seated against said shoulder while leaving an end portion of the flange projecting outwardly beyond the second ring, a generally flat disk of the same diameter as said second ring lying against the latter and pressed into the end of said flange, said projecting portion of said flange beyond said disk being bent inwardly around the periphery of the disk to locate the latter and said second ring rigidly together and against said shoulder, cylindrical flanges integral with the inner periphery of said rings and projecting toward each other to provide axially spaced internal cylindrical pole faces, and an annular winding disposed between said rings and operable when energized to polarize said faces oppositely.

2. In a clutch of the character described, the combination of, a generally flat ring of magnetic material having a cylindrical flange around its outer periphery, the free end of said flange being recessed to provide an internal shoulder axially spaced from the flange end, a second magnetic ring pressed into said flange and seated against said shoulder while leaving an end portion of the flange projecting outwardly beyond the second ring, a generally flat disk of the same diameter as said second ring lying against the latter and pressed into the end of said flange, said projecting portion of said flange beyond said disk being deformed to overlap the end of the disk and locate the latter and said second ring rigidly together and against said shoulder, cylindrical flanges integral with the inner periphery of said rings and projecting toward each other to provide axially spaced internal cylindrical pole faces, and an annular winding disposed between said rings and operable when energized to polarize said faces oppositely.

References Cited in the file of this patent

UNITED STATES PATENTS

| | | |
|---|---|---|
| 2,354,854 | Doll | Aug. 1, 1944 |
| 2,488,552 | Oetzel | Nov. 22, 1949 |
| 2,490,044 | Garbarini et al. | Dec. 6, 1949 |

FOREIGN PATENTS

| | | |
|---|---|---|
| 119,972 | Germany | Nov. 9, 1900 |